Feb. 26, 1963 H. W. DECKER 3,079,090
METHOD AND APPARATUS FOR APPLYING LIQUIDS
Filed April 27, 1959 4 Sheets-Sheet 3
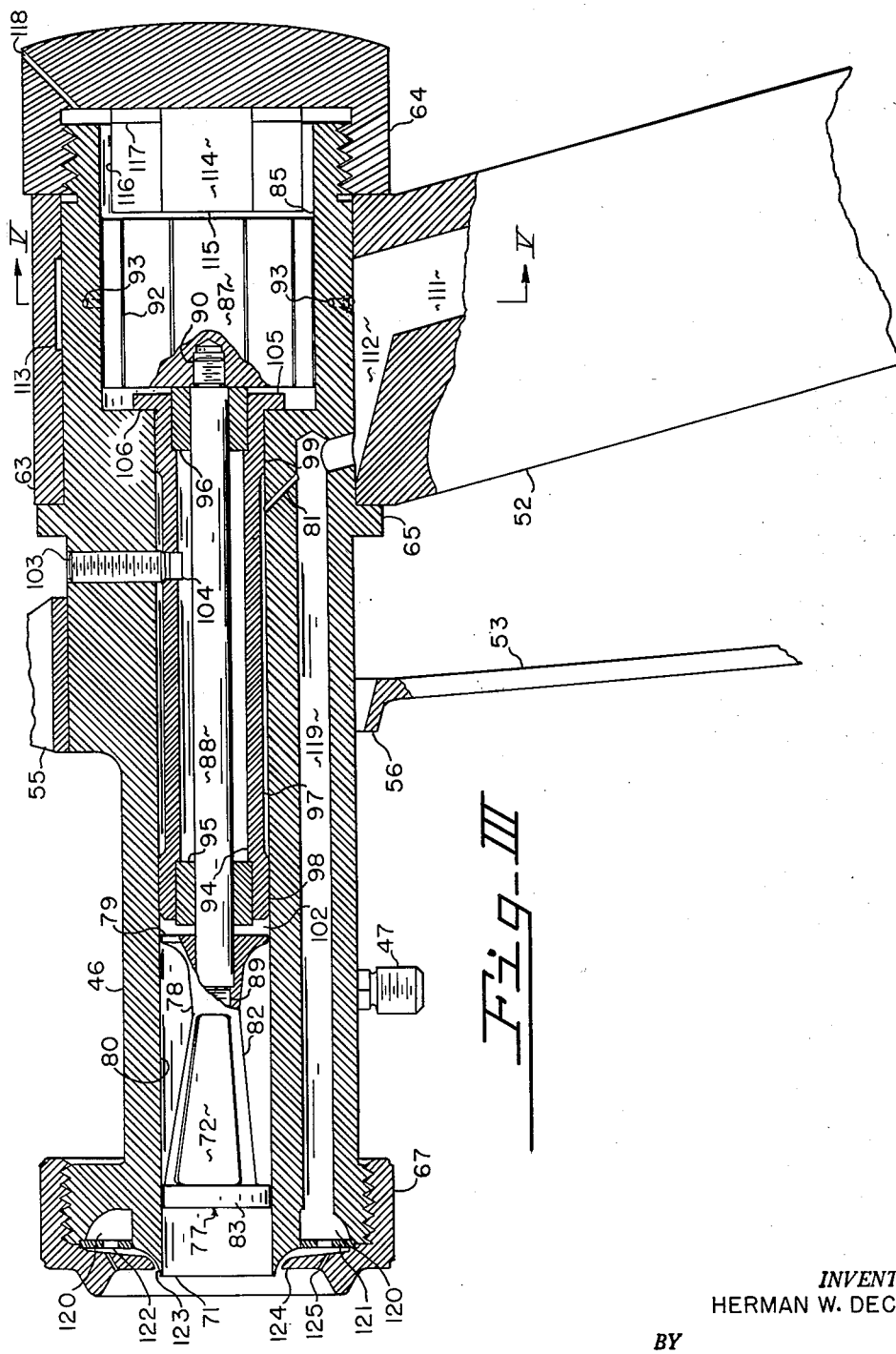
INVENTOR.
HERMAN W. DECKER
BY
Marshall, Marshall & Yeasting
ATTORNEYS Feb. 26, 1963   H. W. DECKER   3,079,090
METHOD AND APPARATUS FOR APPLYING LIQUIDS
Filed April 27, 1959   4 Sheets-Sheet 4
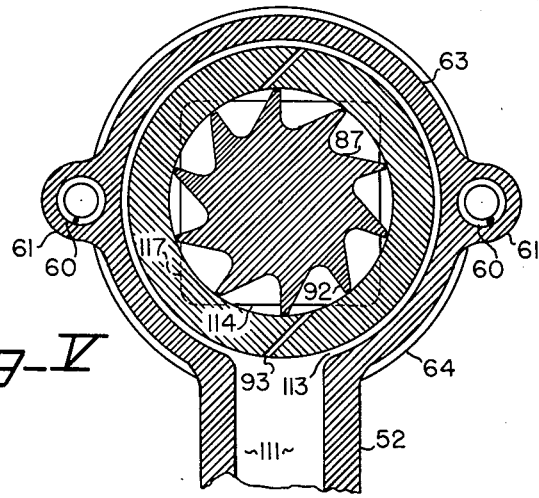
_Fig_V_
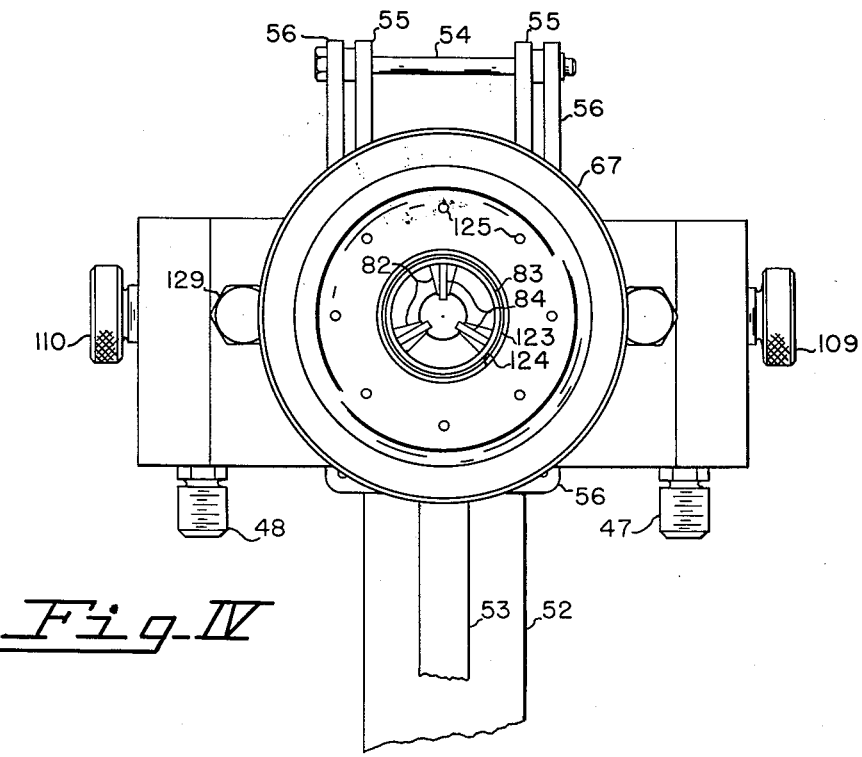
_Fig_IV_
INVENTOR.
HERMAN W. DECKER
BY
Marshall, Marshall & Yeasting
ATTORNEYS

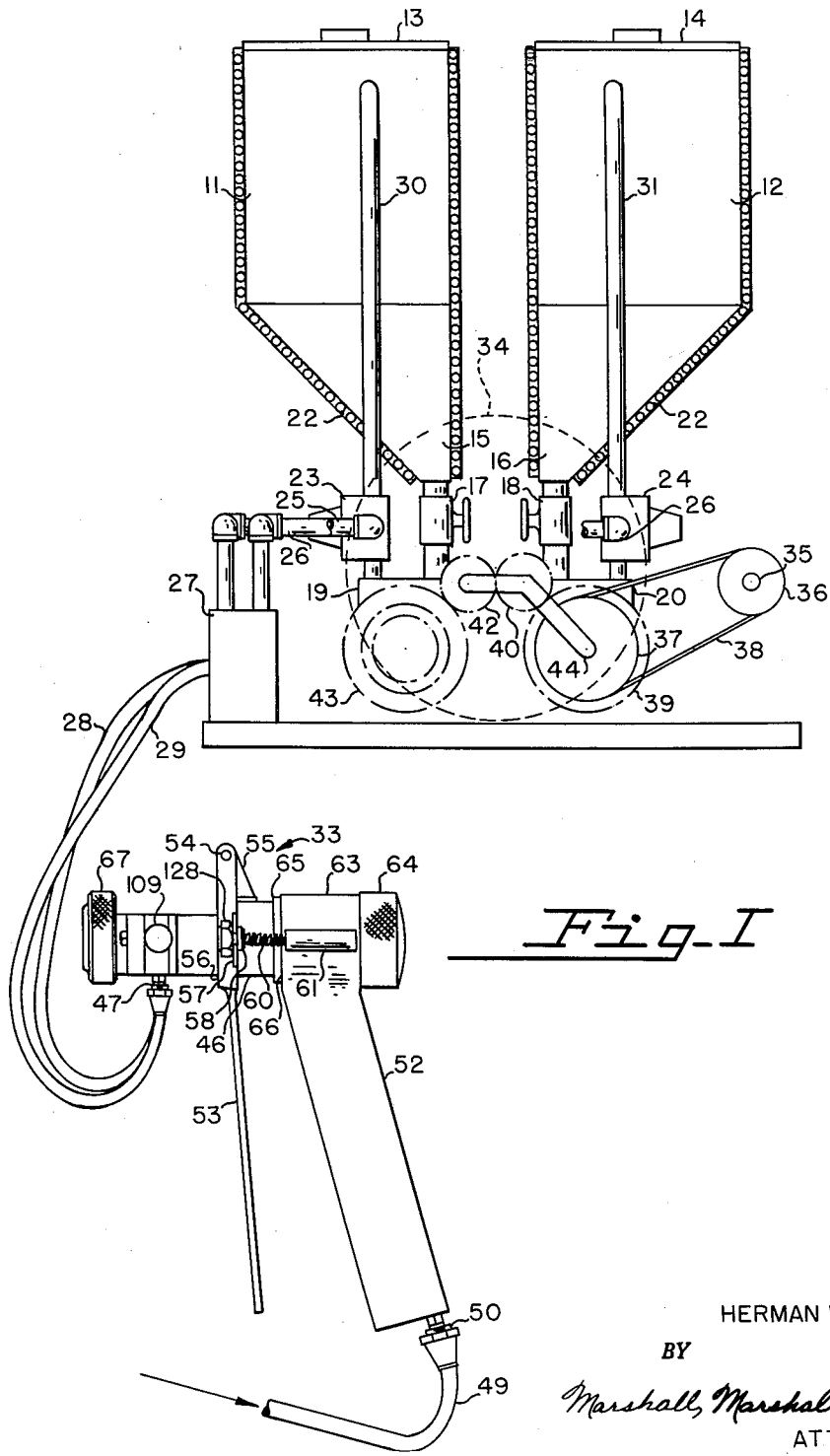

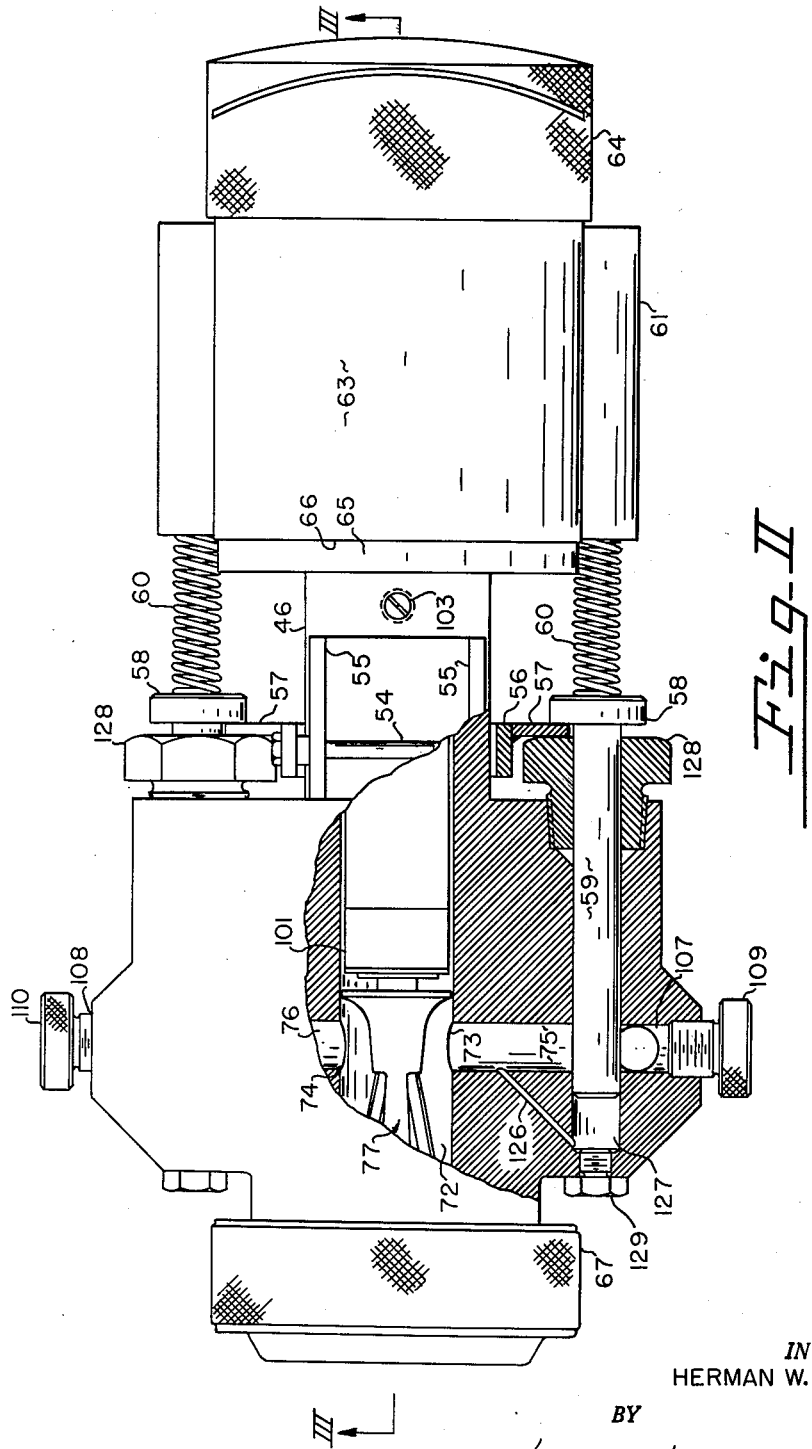

United States Patent Office 3,079,090
Patented Feb. 26, 1963

3,079,090
METHOD AND APPARATUS FOR
APPLYING LIQUIDS
Herman W. Decker, P.O. Box 1318, Stuart, Fla.
Filed Apr. 27, 1959, Ser. No. 809,166
12 Claims. (Cl. 239—142)

This invention relates to apparatus for and methods of forming bodies from fluid constituents. It is particularly applicable to methods and apparatus for application of mixtures of components which must be blended to be effective and which react rapidly upon being intermixed. The applied mixtures to which the invention pertains can be in the form of thin skins as coatings or in bodies of substantial thickness.

Heretofore, attempts have been made to spray combinations of materials which interact rapidly. Such efforts have entailed the use of the interrelated but individual spray nozzles for the several reacting components which are to be applied. Those nozzles have been so oriented in a fixed relationship to each other and to the work upon which they are directed as to cause the intermixture of the reacting materials on the surface of the work. These multi-nozzle spray devices are extremely heavy and cumbersome to manipulate, and accordingly are not ordinarily employed as hand tools. Further, in many applications, they cannot be employed effectively because the reacting substances must be applied to other than the upper face of horizontal surfaces and, therefore, tend to fall away from the application surface before they have an opportunity to react thereon.

It is also known to create mottled finishes by spray painting techniques utilizing spray guns wherein different coating mixtures are emitted from a single nozzle in a single operation without effecting an intimate intermixing of the coating media to form homogeneous droplets. According to those techniques a spray stream made up of intermixed discrete droplets of the several coating media is deposited.

Recently a number of substances have been developed which can be formed into solid massive portions of virtually unlimited form from intermixed and interreacted liquid components. These substances have found particular application in the construction of fluid, impervious vessels, especially in boat construction. Certain of these materials have been compounded to have reaction times wherein the hardening process, upon being accompanied by a foaming or expanding process, is initiated within seconds of the intermixing of the several constituents. Such compounds readily lend themselves to casting processes wherein the substances are mixed and poured into a mold, either simultaneously or virtually simultaneously.

The present invention involves apparatus and methods for combining and applying liquids to surfaces upon which they form solid portions of substantial structural strength by combining the interreacting fluid substances in a blending chamber within a spray gun immediately adjacent the nozzle of that gun such that the intermixed substances are entrained in a stream and applied to the surface upon which the solid body is to be formed. The proximity of the region of combination to the gun nozzle enables rapidly reacting constituents to be employed and to be applied to surfaces where they are reacted sufficiently to be self-sustaining on contact even through the surfaces are oriented so that gravity tends to cause the coating to fall away. Where the constituents are of the foaming type this process can be termed "foamed in place." Typical utilizations enable epoxy polyester and polyurethane formulas to be foamed in place by blending the catalyst accelerators and resins in a chamber directly adjacent an unrestricted nozzle and spraying the blended constituents from that unrestricted nozzle.

An object of the invention is to improve the techniques and apparatus for fabricating structures, particularly from fluid resins.

Another object is to enable interreacting fluids to be combined and deposited in place in a single stream.

A third object is to provide an apparatus for applying liquids to surfaces which is of light weight and is easily manipulated by hand for applying combinations of fluids which interact rapidly.

Another object is to insure adequate mixing of interacting components within a liquid dispensing apparatus.

Another object is to facilitate control of the proportioning of a plurality of fluids to be blended in a liquid dispensing apparatus.

A further object is to facilitate the cleaning of a liquid dispensing apparatus.

Another object is to afford a reliable and rugged agitating apparatus to facilitate blending of liquid constituents in a dispensing device.

In accordance with these objects this invention entails in one embodiment a hand-manipulated spray gun having an unrestricted nozzle which communicates directly with a blending chamber into which two rapidly interreacting liquids are fed. In one application of this device, the two liquids react within thirty seconds or less to form a solid expanded body or foam. Accordingly, the liquids must be rapidly and intimately blended and immediately ejected from the chamber onto the surface to which they are to be applied without encountering and building upon the surfaces of the coating apparatus. The spray gun for this purpose includes an agitating means in the form of a paddle wheel which is driven with substantial torque at high speed by a self-contained air motor, advantageously an air turbine within the gun. This paddle wheel causes the liquids to be thoroughly intermixed, impels them toward the area from which they are deposited, and confines them to an area within the coating apparatus in which they contact no surfaces of the apparatus. The gun includes a triggering device controlling valves individual to the supply ducts for the fluids to be blended. Coupled to the gun are the supply lines for the interreacting fluids and an air supply line. The air supply provides the driving force for the agitator in the blending chamber and creates the pressure gradients necessary to entrain the blended fluids and carry them to the surfaces upon which the fluids are to be applied.

The above and additional objects and features of this invention will be appreciated more fully from the following detailed description when read with respect to the accompanying drawings in which:

FIG. I is a schematic representation of the overall depositing apparatus including a pair of fluid reservoirs, means feeding the fluid from the reservoirs through suitable conduits and a spray gun typical of this invention shown in side elevation;

FIG. II is an enlarged plan view of the spray gun of FIG. I with portions broken away and sectioned to show internal structural details;

FIG. III is an enlarged sectioned side elevation of the spray gun of FIG. I taken along line III—III of FIG. II;

FIG. IV is an enlarged front view of the spray gun of FIG. I showing the unrestricted nozzle, portions of the agitator construction, and the means for feeding reacting fluids to the blending chamber; and FIG. V is a cross section of the spray gun of FIG. I taken along the line V—V of FIG. III.

In the following description the coating apparatus will be described as constructed for and utilized in the application of polyurethane foam formed from a combination of an isocyanate component and a premixed polyester component which, when brought together, rapidly form a polyurethane foam and, while in the liquid state are extremely viscous. The physical and chemical properties of these materials have in the past made them extremely difficult to handle and the present invention offers particular advantages with regard to utilizations of these materials. However, it is to be appreciated that the apparatus techniques and materials discussed below are presented merely as illustrative of the invention and its utilization, and such disclosure should not be read as limiting either the spirit or scope of the invention.

In FIG. I, two tanks 11 and 12 having covers 13 and 14, respectively, are shown. The lower portion of each tank forms a sump 15 and 16 leading through valves 17 and 18 to an intake for gear pumps 19 and 20 which insure the positive displacement of accurate amounts of the respective fluids within the tanks. The viscous nature of the fluids dictate that the tanks be maintained at an elevated temperature. The walls of the tanks are provided with insulation and heating elements 22 to raise the fluid temperature and reduce their viscosity. In practice with the exemplary constituents, the tanks are heated to about 95° F. to keep the viscosities constant so that metering through the positive displacement pumps will always be uniform. In order to further facilitate uniformity of the physical properties of the fluid, it is continuously recirculated through a diaphragm valve 23 which opens upon the creation of a given pressure difference to by-pass the excess of the fluid from the outputs of the pumps back to the respective tanks 11 and 12 through lines 30 and 31 while the fluids are not utilized by the coating apparatus at the rate they are delivered from the pumps. When fluid is permitted to flow to the coating apparatus, it passes through feed lines 25 and 26 to coupling 27 and thence to the feed hoses 28 and 29. Thus, while the shutoff valves 17 and 18 are open and the metering pumps 19 and 20 are operative, the fluid is recirculated to maintain a uniform temperature by the automatic pressure relief of valves 23 and 24.

Proportioning of the fluids as they are fed through the hose lines 28 and 29 to the gun 33 is effected by adjusting the speeds of the respective positive displacement pumps 19 and 20. Advantageously, both of those pumps are driven by a single motor 34 shown in phantom in FIG. I. That motor is coupled by suitable means such as belting not shown to a counter shaft 35 having a pulley 36 coupled to a pulley 37 on the drive shaft on pump 20 by means of a V-belt 38. This driving arrangement affords a high degree of flexibility in the speed or drive of pump 20. Each of the pulleys can be of the multi-step cone type, thereby affording adjustment in speed between the motor and the counter shaft and the counter shaft and the pump 20. Rotation of the drive shaft for pump 20 is employed as the driving means for pump 19 to insure a constant relationship between the operating speeds of these pumps and thereby provide an accurate proportioning of the quantities of fluid delivered by those pumps which is determined by the relationship of those speeds. For this purpose a gear 39 is mantained on and keyed to the drive shaft of pump 20. A pair of idler gears 40 and 42 couple gear 39 to a gear 43 maintained on and keyed to the drive shaft for pump 19. The idler gears and the gear 43 can be adjusted in diameter and in the number of teeth. Provision for this adjustment is afforded by the mounting of the idler gears on a bell crank 44 pivoted co-axially with the shaft of pump 20 so that the first idler gear 40 is maintained with the appropriate radial separation from the shaft on which gear 39 is mounted to remain in engagement with that gear for all angular displacements of bell crank 44 required by virtue of variations in the diameter of the driven gear 43. In the exemplary embodiment, gear 39 has been maintained a constant having 100 teeth and gear 43 is changed to atler the speed ratio between the two pumps, the range of change utilized extending from a twenty-tooth gear to one of 120 teeth in one tooth increments. It is to be understood, however, if necessary, the idlers 40 and 42 can also be compounded to produce greater ranges of speed variation.

When metering is accomplished as by pumps 19 and 20, the fluids to be intermixed and deposited from the gun 33 can be simply valved to the gun without requiring intricate adjustment of those gun valves to establish the proper proportions. However, it is to be understood that it is within the compass of this invention to employ metering valves. Alternatively, not all variation in speed need be obtained in the belting drive; for example, the speed of the motor 34 might be adjusted as by varying its voltage in any well-known manner.

In operation, the motor 34 is operated prior to permitting any fluid to be emitted from the spray gun in order to develop the desired viscosity in the respective fluids. Conveniently, a thermostat can be mounted in intimate heat transfer relationship to each of the supply tanks to control the heating effect of the respective heating elements 22 and, where those elements are electric resistance heaters, the motor, heating elements, and thermostats can be actuated through either common or individual circuits (not shown) which may be of conventional form.

As shown in FIG. I, hoses 28 and 29 are coupled to gun 33 near the nozzle end of its barrel 46 through suitable threaded couplings 47 and 48 best seen in FIG. IV. Air is supplied to the gun 33 through hose 49 and coupling 50 at the bottom of gun handle 52.

A trigger 53 is positioned adjacent gun handle 52 and is pivoted at 54 on a bracket 55 extending upwardly from the top of the barrel. The trigger 53 has a yolk portion 56 straddling barrel 46 and projecting upwardly to the pivot 54. Each side of the yolk portion is provided with an ear 57 projecting outwardly from the barrel and fitting beneath a flange 58 of a valve stem 59 (FIG. II). A spring 60 fitting within and projecting from a housing 61 on the side of handle 52 biases the valve stem to the closed position and the trigger 53 away from handle 52. Each valve stem 59 fits into a valve beside the major bore of the barrel as best seen in FIG. II to open its associated passage from the couplings 47 or 48 when the trigger 53 is retracted toward the handle and to close its passage when the trigger is released.

Barrel 46 fits within a cylindrical portion 63 of the upper body of handle 52 and is retained therein by means of an end cap 64 which is threaded thereon to draw a flange 65 on the barrel against foremost lip 66 of the cylindrical portion of handle 52. The nozzle end of the barrel terminates with a diffusion disk as best seen in FIGS. III and IV which is retained in place by a nozzle cap 67 threaded on a flange at the foremost end of barrel 46.

Details of the spray gun for applying a stream of blended interacting liquids conveyed thereto through hoses 28 and 29 are best appreciated from a consideration of FIGS. II and III.

In view of the viscous nature of the individual components and the resulting blend and the rapid reaction time of the blend in forming a solid mass, it is desirable to eject the blended liquids from the gun as soon as possible after their blending has been completed and to avoid contacting parts of the gun with the mixture. Accordingly, an unrestricted nozzle 71 is employed wherein no structure is provided upon which the blended fluids might tend to build up, and a blending chamber 72 is positioned immediately adjacent and in communication with the nozzle 71. Ports 73 and 74 lead into the chamber near its rearmost limits in a diametrically opposed relation from ducts 75 and 76 to which the hoses 28 and 29, respectively, are coupled by couplings 47 and 48. Thorough blending of the liquid constituents fed into the chamber 72 is insured by the operation of an agitator 77 fitted within the chamber 72 between the ports and nozzle 71. Valve stems 59 in the form of right circular cylinders project into the ducts 75 and 76 between the couplings 47 and 48 and the ports 73 and 74 to provide means to control the flow of liquid from the ports.

The blending of the liquid constituents in chamber 72 is facilitated by the construction of and drive for agitator 77. That agitator comprises a bell-shaped rear portion 78 having an outer lip 79 extending into close proximity with the cylindrical wall of the bore 80 of gun barrel 46. The lip of the bell, in combination with a slight positive pressure of air behind that lip and admitted thereto through passage 81 in a manner to be discussed in more detail hereafter, prevents the flow of any liquid constituents into the rear portion of the gun. Pitched vanes 82 of the agitator 77 tend to draw the liquids from the ports into a center portion of chamber 72 along the axis of the agitator and chamber bore where those constituents are thoroughly intermixed and advanced toward the nozzle 71. The longitudinal vanes 82 extend from the top of bell 78 along the longitudinal axis of chamber 72 and diverge from that axis until they intercept an annular front end member 83 having an outer diameter which closely fits within the bore 80. Additional agitation of the mixture within chamber 72 and the confining of that mixture to the axial region of the chamber is afforded by radial vanes 84 extending inwardly from the annular member 83. Vanes 84 can best be seen in FIG. IV. Advantageously, they extend only partially toward the axis of chamber 72 and provide an open center region through which the fluid passes to the nozzle 71 without accumulating on the vanes.

Agitator 77 is driven in rotation around its longitudinal axis by means of an air motor housed in a second enlarged bore 85 in the rear portion of barrel 46. That motor which is advantageously in the form of a turbine having a turbine wheel 87 is coupled to agitator 77 through a shaft 88 as by means of threaded couplings 89 and 90. One form of turbine wheel is illustrated in cross section in FIG. V. It has vanes 92 which are driven by air impinging from nozzles 93 conveniently formed in the walls of barrel 46. This arrangement provides a self-contained motor, and agitator for the gun which is of light weight and requires no extra power coupling, such as a flexible shaft.

The moving parts of the gun lend themselves to rapid removal and cleaning by virtue of their construction. Barrel 46 has an internal construction consisting primarily of a first bore 80 which is of uniform circular cross section and a second bore 85 of greater uniform circular cross section. First bore 80 forms a blending chamber and in addition houses a bearing tube 94 in which shaft 88 is journalled by means of bushings 95 and 96. Tube 94 is undercut at 97 along a substantial portion of its length and is supported on the walls of bore 80 at its ends by means of shoulders 98 and 99. Flats 101 (FIG. II) are formed on the sides of shoulder 98 to permit the flow of air from passage 81 along the undercut to the region 102 behind the lip 79 of the agitator bell. Bearing tube 94 is retained within bore 80 by means of a quick release fastening or clamp which can be in the form of a screw 103 fitting into a depression 104 in the bearing tube wall. Alternatively, that retaining element can be in the form of a spring biased detent not shown. Bearing tube 94 is provided with a headed area having a flange 105 which bears against the shoulder 106 defining the juncture of the bore 80 with bore 85.

The proportioning of the liquid constituents which are intermixed in the blending chamber 72 determines the reaction time of those constituents, the density of the resulting product and the strength inherent in that product. Accordingly, in many applications the proportioning of those materials is critical. While the positive displacement pumps 19 and 20 are arranged with drives calculated to establish the given proportions, it is desirable that some means be afforded for checking the delivery of fluid to the gun. One means of checking such delivery and the proportioning accomplished is by bleeding the unmixed fluids from their delivery at the gun for a given fixed interval and measuring the quantity of fluids thus delivered. For this purpose metering ports 107 and 108 having caps 109 and 110 are provided. The delivery of fluid is measured by removing caps 109 and 110 and operating the pumps 19 and 20 for the given interval with the valves to ports 73 and 74 closed as shown in FIG. II. Thus, all of the fluid delivered through couplings 47 and 48 is barred from the ports 73 and 74 by their respective valves and is caused to be delivered from the sides of the gun in uncombined form through ports 107 and 108, respectively. Weighing or otherwise measuring the delivered quantities of fluid indicates the proportions and rate of delivery being obtained.

The several paths for the air supply to the gun will now be considered. Compressed air is fed through coupling 50 in the handle 52 to perform three functions. That air drives the turbine rotor 87 to provide the actuation of agitator 77. It generates an area of reduced pressure adjacent the unrestricted nozzle 71 to draw the blended fluid constituents from the chamber 72 and entrain them in a stream which can be deposited upon the surface to be coated. It prevents the flow of the fluid constituents from the blending chamber 72 back into the vicinity of the bearing tube 94 and the driving means for the agitator. From coupling 50 the air flows through passage 111 in handle 52 to a manifold region 112 at the upper portion of the handle within the barrel embracing cylindrical regions 63.

The air for driving the turbine rotor 87 flows from manifold 112 into a counterbore area 113 within cylindrical body 63 and from there to the generally radial passages constituting the nozzles 93 for the turbine. The spent air escapes from the motor chamber within bore 85 rearwardly around spacer block 114. That air tends to create a film lubricating the rear surface of turbine rotor 87 from the front face 115 of spacer block 114 and then to escape past the flats 116 on the spacer block. Flanges 117 extending beyond those portions of the block 114 which fit bore 85 to maintain the separation of the interior of cap 64 from the rear edge of barrel 46 whereby the spent air can flow to the passage 118 in cap 64 and escape to the exterior of the gun.

The remainder of the air supplied to manifold 112 flows through passage 119 to port 81 passing that portion of the air having the function of confining the fluids to the blending chamber 72 as outlined above and to an annular manifold region 120 within the enlarged end of the barrel adjacent the gun nozzle. Clamped between the front end of barrel 46 and cap 67 is a diffusion disk 121 having a series of apertures 122 dispersed in a circular array around the nozzle opening. Upon passing the diffusion disk, the air is fed in a hollow, conical stream outwardly of the nozzle 71 and closely adjacent thereto. The stream is formed between the outer lip 123 of barrel 46 and the inwardly directed flange 124 of nozzle cap 67. It is supplemented and controlled by director passages 125 which permit additional air to flow toward the axis of the nozzle in order to enhance its flow pattern.

In operation, heaters 22 are actuated to bring the fluid constituents in tanks 11 and 12 up to temperature and motor 34 is started to recirculate the fluid through pumps 19 and 20. The air supply through hose 49 is turned on, thereby initiating rotation of turbine rotor 87 and agitator 72. Prior to the admission of fluid to the blending chamber, guns of the type illustrated have their agitators attain a speed of 25 to 35,000 r.p.m. When the gun is used in a foam-in-place process, such as might be applied to a glass fiber mat laid over a mold for a boat hull, the admission of the fluid constituents through ports 73 and 74 by the drawing of trigger 53 toward handle 52 slows the agitator to a speed of from 6 to 8,000 r.p.m. When the trigger is operated to retract the ends of valve bodies 59 from beyond the limits of passage 75, fluid flows around the ends of the valve structures and through ports 73 and 74. By positioning the fluid ports in alignment and diametrically opposed to each other, mixing is initiated upon their introduction into blending chamber 72. It is further enhanced by the pitched blades or vanes 82 of the agitator which carry the fluids into the open basket-like center of the agitator and along the longitudinal axis of that agitator toward the unrestricted nozzle 71. Radial vanes 84 direct the fluid to the axis of the nozzle, thereby preventing the buildup of any reacted materials on the elements of the agitator or the walls of the blending chamber and nozzle. In this manner, the fluid constituents are brought together only immediately adjacent the region from which they are applied and no waste is encountered. That material which remains in the hoses 28 and 29 can be fed back into the tanks 11 and 12 and reused at a later date.

When the operator desires to cease the operation of foaming in place, he merely releases his trigger 53 permitting it to be carried forward by the action of springs 60 upon the heads 58 for valve body 59, whereby the valve bodies are carried across and close the ducts 75 and 76. In order to avoid any retardation in the closure of the valves due to entrapped gases or liquids, bleed passages 126 are provided from the extension of bore 127 in which valve stem 59 slides to the respective ducts 75 and 76 so that those gases and liquids are bled into the ducts.

Upon completion of a utilization of the gun, those parts which are contacted by the fluid constituents can rapidly be disassembled for cleaning. Nozzle cap 67 can be unscrewed from the forward end of valve 46. The agitator 77, bearing tube 94, shaft 88, and turbine rotor 87, assembly can be withdrawn from the rear of the gun by unscrewing cap 64 and releasing the detent 103. Periodically, the ducts and valves can be cleaned by the removal of bleeding port caps 109 and 110, release of spring 60, removal of the threaded bushings 128 through which the valve bodies 59 pass, and the removal of caps 129 at the opposite ends of the bores in which valve bodies 59 fit. The gun can be reassembled in the inverse of the order recited for disassembly.

While the spray gun has been described for dispensing a stream of an isocyanate component and a polyester component homogeneously blended and dispersed into fine droplets, it is to be appreciated that other blends can be achieved effectively in the apparatus to form atomized streams. Further, although air has been proposed as the medium for entraining the droplets in a stream (both within the gun as a result of the flow through passage 81 and around lip 79, and beyond the unrestricted nozzle 71 by virtue of the eductor action of the stream from manifold 120) other entraining gases can also be employed. Thus, the spray or droplet stream is entrained within the basket interior of agitator 77 by the combined action of any of a number of gases flowing around bell lip 79 and the pitched, longitudinal blades 82. While being homogeneously blended and dispersed by the agitator, that stream of entrained droplets is sustained and urged along the axis of agitator 77 toward nozzle 71 without contacting or building up on the front annular portion 83 of the agitator or the walls 80 of the chamber 72 and issues from the nozzle in a confined cone. In the case of some liquid materials such as those which oxidize, the entraining and cone directing gas advantageously can be of a non-oxidizing nature.

While the above description has been directed to a spray gun which is manipulated by hand, it is to be appreciated that a coating applicator of this type might be of other forms and it is the inventor's intention to embrace such forms.

Having described the invention, I claim:

1. A device for dispensing a stream of blended interreacting liquids comprising a nozzle having an orifice; a blending chamber of right circular cylindrical form in communication with said orifice; an agitator in said chamber, said agitator comprising an annulus of an outer diameter closely fitting the diameter of said chamber and normal to the chamber axis adjacent said orifice, a bell coaxial with the chamber and having a major cross section closely fitting the cross section of said chamber, a minor cross section substantially less than the chamber cross section and axially spaced toward said orifice from the major cross section, and a flaring body portion between said major and minor cross sections, and a plurality of diverging vanes spaced on the periphery of said minor cross section and extending longitudinally of said chamber to said annulus; means for rotating said agitator about its longitudinal axis; said chamber having a plurality of ports for admitting liquid located longitudinally of said chamber in alignment with a reduced cross section of said agitator; and means to control the flow of liquid from said ports.

2. A device according to claim 1 wherein each of said vanes is flattened transversely and is pitched to carry the liquids toward and along the axis of said chamber to said orifice.

3. A device according to claim 1 wherein said liquid ports are located on diametrically opposed portions of the chamber wall and are aligned with a portion of said bell whereby said bell portions is interposed in the path between said ports across said chamber.

4. A device according to claim 1 wherein said agitator includes a plurality of vanes directed radially and mounted on said annulus.

5. A device according to claim 1 including a liquid duct communicating with each port in said chamber, a valve in each duct, a coupling to each duct for engagement with a liquid supply, a meter port in each duct between said coupling and said valve, and means to close said meter port.

6. A device according to claim 4 wherein said radial vanes have their innermost ends spaced apart to provide an open center along the axis of said agitator.

7. A device for applying a stream of blended interreacting fluid components which rapidly harden into a massive body comprising a barrel having a first bore of a given uniform diameter extending rearwardly from its front end and having a second bore coaxial and continuous with said first bore and of a diameter greater than said given diameter at its rear end, a front portion of said first bore forming a blending chamber, said barrel having a port into said blending chamber for each fluid component, a paddle wheel in said blending chamber, said paddle wheel having a portion closely fitting the walls of said chamber, said paddle wheel being longitudinally slidable along said bore, said second bore being open at the rear of said barrel, said second bore forming a motor chamber, a turbine wheel in said motor chamber, said paddle wheel being longitudinally slidable along said chamber, turbine nozzle supported on said barrel and positioned to direct a gas stream toward said turbine wheel in a driving direction, a shaft coupling said turbine wheel to said paddle wheel, a bearing tube fitting within said first bore behind said blending chamber and having an outer diameter slightly less than the diameter of said first bore, said bearing tube being longitudinally slidable along said bore, a journal for said shaft supported by said bearing tube, a quick release latch for said bearing tube on said barrel, and a detachable cap on the rear of said barrel for retaining said paddle wheel, shaft, bearing tube and turbine wheel within said barrel whereby they can be slid longitudinally toward the open rear end of said barrel as a unit and be rapidly removed from said barrel for cleaning.

8. A device for applying a stream of blended interreacting components comprising a barrel having a first bore of a given uniform diameter extending from its front end and having a second bore coaxial with said first bore and of a diameter greater than said given diameter at its rear end, a detachable cap mounted on the rear end of said barrel and closing the end of said second bore, an air motor in said second bore, a paddle wheel in said first bore adjacent the front end of said barrel, said wheel comprising a basket having an annulus at its front end, a bell at its rear end having a rearmost lip closely fitting said first bore and a plurality of vanes extending between said annulus and bell, said wheel being longitudinally slidable in said first bore, a coupling shaft between said motor and said paddle wheel arranged to rotate said paddle wheel when said motor is actuated, a journal tube for said shaft closely fitting within said first bore, said journal tube being longitudinally slidable within said first bore, quick release means to clamp said tube within said first bore whereby said paddle wheel, shaft and journal tube can be slid longitudinally toward the rear of said barrel as a unit and be rapidly removed from said barrel for cleaning by removal of said cap and release of said clamp.

9. A device for applying a stream of blended interacting fluid components which rapidly harden into a massive body comprising a barrel having a bore of a given uniform diameter extending rearwardly from its front end and having a motor housing at its rear end, said bore opening into said motor housing and having the longitudinal projection of its entire cross-section encompassed by the open cross-section of said motor housing; an agitator in said bore adjacent the front end of said barrel and closely fitting the wall defining said bore, said agitator comprising an annulus of an outer diameter closely fitting the wall defining said bore and normal to the axis of the bore in proximity to said front end, a bell coaxial with said bore having its flared portion closely fitting the cross-section of said bore to define the rearmost limit of a blending chamber within said bore, said bell having a reduced cross-section normal to the axis about which the bell form is generated which is substantially less than the cross-section of said bore and is axially spaced from said flared portion toward the front of said barrel, a surface of said bell extending between said flared portion and said reduced cross-section and a plurality of diverging vanes spaced on the periphery of said reduced cross-section and extending longitudinally of said bore to said annulus; the wall defining said bore having a plurality of ports in registration with the region of said agitator including said reduced cross-section; a motor in said housing; a bearing tube longitudinally slidable in said bore intermediate said motor and said agitator; a coupling between said motor and said agitator supported by said bearing tube; and a detachable cap on the rear of said motor housing closing an open rear end of said housing whereby upon removal of said cap said agitator bearing tube and coupling can be slid longitudinally of said bore and through said housing to be rapidly removed from said barrel as a unit.

10. In a reactant liquid dispenser, a blending chamber of right circular cylindrical configuration, an end port at a first end of said chamber from which intermixed liquids issue, an agitator adjacent said end port and extending longitudinally of said chamber coaxial therewith, said agitator having an unbroken bell-shaped surface coaxial with said chamber having the flared portion of the bell project rearwardly from said orifice, said flared portion at its maximum cross-section closely fitting the wall of said chamber to define the rearmost limit of said chamber, pitched vanes extending from said small bell diameter longitudinally of said chamber and diverging from the agitator axis toward said orifice, said chamber walls having a plurality of ports for admitting reacting liquids into said chamber, said ports being located along the length of said chamber substantially at the least diameter of said bell and diverging pitched vanes.

11. In a reactant liquid dispenser, a blending chamber of right circular cylindrical configuration, an end port at a first end of said chamber from which intermixed liquids issue, an agitator adjacent said end port and extending longitudinally of said chamber coaxial therewith, said agitator having an unbroken bell-shaped surface coaxial with said chamber having the flared portion of the bell project rearwardly from said orifice, said flared portion at its maximum cross-section closely fitting the wall of said chamber to define the rearmost limit of said chamber, pitched vanes extending from said small bell diameter longitudinally of said chamber and diverging from the agitator axis toward said orifice, an annulus coupled to said vanes having a plane normal to the axis of said chamber and closely fitting said chamber walls, and means to rotate said agitator around its longitudinal axis, said chamber walls having a plurality of ports for admitting reacting liquids into said chamber, said ports being located along the length of said chamber substantially at the least diameter of said bell and diverging pitched vanes.

12. In a reactant liquid dispenser, a blending chamber of right circular cylindrical configuration, an end port at a first end of said chamber from which intermixed liquids issue, an agitator adjacent said end port and extending longitudinally of said chamber coaxial therewith, said agitator having an unbroken bell-shaped surface coaxial with said chamber having the flared portion of the bell project rearwardly from said orifice, said flared portion at its maximum cross-section closely fitting the wall of said chamber to define the rearmost limit of said chamber, pitched vanes extending from said small bell diameter longitudinally of said chamber and diverging from the agitator axis toward said orifice, an annulus coupled to said vanes having a plane normal to the axis of said chamber and closely fitting said chamber walls, means to rotate said agitator around its longitudinal axis, said chamber wall having diametrically opposed ports situated substantially at the least diameter of said bell and said diverging pitched vanes, and a passage extending radially of said chamber axis to each of said ports.

References Cited in the file of this patent

UNITED STATES PATENTS

| | | |
|---|---|---|
| 1,490,632 | Paul | Apr. 15, 1924 |
| 1,861,475 | Hopkins et al. | June 7, 1932 |
| 1,974,538 | Johnston | Sept. 25, 1934 |
| 1,997,874 | Power | Apr. 16, 1935 |
| 2,011,483 | Hansen | Aug. 13, 1935 |
| 2,513,081 | Clarke et al. | June 27, 1950 |
| 2,555,271 | Jauch et al. | May 29, 1951 |
| 2,564,392 | Burrucker | Aug. 14, 1951 |
| 2,705,132 | Neville | Mar. 29, 1955 |
| 2,739,013 | Muller | Mar. 20, 1956 |
| 2,753,162 | Conley | July 3, 1956 |
| 2,788,337 | Preiswerk et al. | Apr. 9, 1957 |
| 2,814,471 | Carr et al. | Nov. 26, 1957 |
| 2,823,143 | Upperman | Feb. 11, 1958 |
| 2,836,464 | Dickinson | May 27, 1958 |
| 2,970,773 | Keryluk et al. | Feb. 7, 1961 |